(No Model.)
P. A. N. WINAND.
GAS OR OIL ENGINE.
No. 563,535.
Patented July 7, 1896.
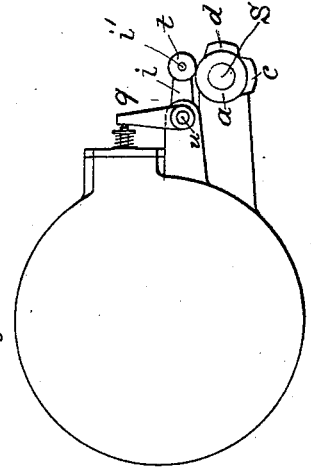
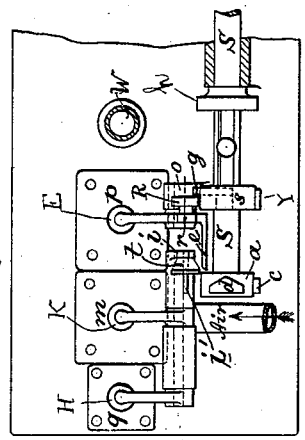
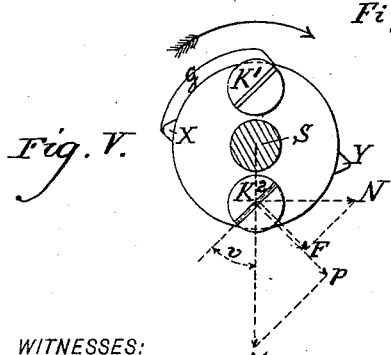
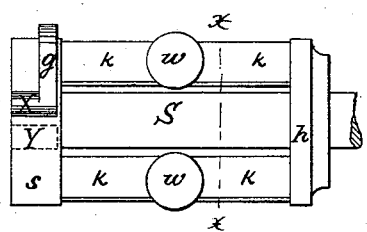
WITNESSES:
David Williams.
Chas. C. Collier
INVENTOR
Paul A. N. Winand,
BY
Chas. B. Collier
ATTORNEY.
THE NORRIS PETERS CO., PHOTO-LITHO., WASHINGTON, D. C.

UNITED STATES PATENT OFFICE.

PAUL A. N. WINAND, OF PHILADELPHIA, PENNSYLVANIA, ASSIGNOR TO SCHLEICHER, SCHUMM & CO., OF SAME PLACE.

GAS OR OIL ENGINE.

SPECIFICATION forming part of Letters Patent No. 563,535, dated July 7, 1896.

Application filed June 26, 1893. Renewed November 30, 1895. Serial No. 570,707. (No model.)

*To all whom it may concern:*

Be it known that I, PAUL A. N. WINAND, a subject of the King of Belgium, residing at the city of Philadelphia, in the county of Philadelphia and State of Pennsylvania, have invented certain new and useful Improvements in Gas or Oil Engines, of which the following is a specification.

My invention relates to that class of gas or oil engines in which during four successive strokes of the piston the induction, compression, expansion, and exhaust of the charge are effected; and its principal object is to so construct and actuate the valve mechanism as that when the speed of the engine is above the normal or desired rate the supply of gas will be cut off and the exhaust be controlled in a manner more simple and effective than has heretofore been attained in engines of the class to which my improvements belong.

In Letters Patent of the United States No. 434,609, bearing date August 10, 1890, granted to A. W. Schleicher and Paul A. N. Winand, there is described an engine in which the regulation of the speed is effected by causing the exhaust-valve to remain closed as long as the speed is above the normal, and while the construction in the patent referred to is remarkably simple, experience has shown me that the retention of the entire products of combustion and successive compressions of the same, by reason of the high pressures caused by such compressions, impose strains upon the engine, while at the same time such method of operating is attended by a loss of power. In my present improvements I have avoided such defects and provide a more efficient means for regulating the speed of the engine.

In the accompanying drawings, Figure I is a plan view in section of sufficient of an engine of horizontal construction to illustrate my invention. Fig. II is a side elevation of same. Fig. III is a rear end elevation. Fig. IV is an elevation of the governing mechanism. Fig. V is a cross-section of the same on line $xx$ of Fig. IV.

A is the cylinder of the engine, B the piston, and C C a water-jacket surrounding the cylinder. The piston B is shown as being at the limit of its forward stroke, and the dotted line $b\ b$ indicates the limit of its instroke. H is the valve for the admission of gas, a chamber in the rear of which communicates with a chamber in rear of valve K, as seen in Fig. I.

K is the valve for the admission of gas and air, and E the exhaust-valve, it being understood, of course, that provision is made for the admission of air in the rear of valve K, as shown in Fig. II.

At one side of the cylinder is mounted a shaft S, driven from the crank-shaft at a speed one-half that of the latter, and shaft S is provided at or near its inner end with a fixed sleeve or collar $a$, having secured thereto cams $c$ and $d$, hereinafter more specifically referred to. Shaft S is also provided with a suitable governor, preferably of the construction shown in Figs. IV and V, the same having a fast sleeve $h$ and a loose sleeve $s$, which latter is moved or drawn toward the sleeve $h$ by the governor when the speed of the engine is above the normal.

The loose sleeve $s$ is provided with cams $g$, $x$, and $y$, hereinafter more fully referred to.

Each of the three valves H, K, and E is provided with a stem extending through the casing, and compression-springs affixed to said stems, as shown, normally tend to keep the respective valves closed.

In a lug on the outer casing of the engine, near its inner end, is mounted a small shaft $u\ u$, having arms $q$ and $m$, adapted to act upon the projecting stems of the valves K and H, respectively, and from one end of said shaft $u\ u$ projects a horizontal arm $i$, carrying at its outward end a pin $i'$, on which is loosely mounted a roller $t$, normally in the path of and adapted to be acted upon by the cam $c$, whereby the opening of the valves H and K is effected for the admission of gas and of combustible mixture to the cylinder. On a stud $o$, the axis of which is coincident with that of shaft $u$, is fulcrumed a bell-crank lever $p$, one arm of which is adapted to act upon the stem of the exhaust-valve E, and its other arm carries an antifriction-roller R, which extends over the sleeve $s$, and is adapted to be acted upon by the cams $g$, $x$, and $y$ to effect the opening of the exhaust-valve E and the discharge of the products of combustion through the exhaust-port W.

The operation of the engine is as follows: While the piston is moving from the position $b\ b$ to that of B, as shown in Fig. I, the cam $c$ on the sleeve $a$ lifts the roller $t$, which, in turn, acts upon the arms $q$ and $m$, and opens the valves K and H. The advancing piston causes a partial vacuum in the cylinder, and consequently a charge of combustible mixture flows into the cylinder through valve K. Upon the return or instroke of the piston, valves K and H close and the combustible mixture is compressed, fired by any suitable means, and then expanded during the next strokes of the piston. During the interval of these two forward and backward strokes of the piston, the cam $d$, also carried by the sleeve $a$, has come in contact with the roller $t$, and has moved, or pushed the latter to the right and out of the path of the cam $c$. To effect this, the cam $d$ is not tapered down at the ends, but is made of equal thickness throughout its entire length. On one side, however, it is cut off, inclining in opposite directions from the center toward each end. The piston has by this time reached the limit of its forward stroke, impelled by the exploded charge, and as the return stroke commences the cam $g$, which is mounted on sleeve $s$, engages roller R, and now the bell-crank lever $p$ is actuated thereby and exhaust-valve E opened, the cam $g$ being of sufficient length to retain the exhaust-valve in its open position until the limit of the instroke is reached. The products of combustion are thus expelled from the cylinder through the exhaust-valve E and pipe W.

The end of the lever $p$ is provided with an arm $e$, having an inclined end extending under and adapted to engage with the conical face of the roller $t$, and when the lever $p$ is raised by the cam $g$ this projecting arm $e$ engages with the conical face of roller $t$ and forces it to the left and into position to be acted upon again by cam $c$.

The cycle of operations, as above, are repeated until the normal speed of the engine is exceeded. When this occurs, the loose sleeve $s$ is caused to move to the right or toward the fast sleeve $h$ a sufficient distance to withdraw the cam $g$ from the path of roller R and to bring the cam $x$ within the path of said roller R. The cam $x$ is much smaller than cam $g$, as seen in Figs. IV and V, and accordingly, through its engagement with roller R, the exhaust-valve E is caused to be opened for a short time only when the piston nearly reaches the end of its instroke, thus permitting a portion of the burned gases to escape, the remaining portion being retained in the cylinder and compressed and expanded by the strokes of the piston until through the operation of the governor cam $g$ engages with roller R, when further burned gases are exhausted into the atmosphere and only that portion remains which is at atmospheric pressure upon the instroke of the piston, at which time a fresh charge of combustible is introduced into the cylinder and the cycle of operations is repeated.

It will be kept in mind that the short cam $x$ is not as high as the cam $g$. When roller R is raised by cam $x$, the arm $e$ of the bell-crank lever $p$ will not be elevated sufficiently to move the roller $t$ back into the path of the cam $c$, the parts being so proportioned as that the roller $t$ will not be shifted, except when the cam $g$ engages with and raises the roller R. The result of this mode of operating is that the gas-valve H and air and gas valve K will remain closed whenever the remaining portion of the exhaust-gases are kept in the cylinder and are opened whenever the exhaust is complete, and a fresh charge of combustible is, in consequence, introduced into the cylinder. In other words, as long as the governor does not allow the exhaust-valve to open for a complete exhaust neither gas nor air is introduced into the cylinder through the induction-valves, but the portion of the products of combustion remaining in the cylinder is compressed and expanded again a number of times. During such successive compressions and expansions the temperature of the contents of the cylinder is reduced, and in consequence the burned gases contract in volume and do not longer entirely fill the cylinder. A partial vacuum is the result, at such time, when the piston reaches the limit of its outstroke, and in order to counteract this a short cam $y$ is provided on the sleeve $s$, which performs the function of lifting the bell-crank lever $p$ at the end of the outstroke, whereby a portion of the burned gases is allowed to reënter the cylinder and replenish its contents.

In the drawings the valves H and K are shown as being actuated by the same lever, but valve K might be disconnected from said actuating-lever and left free to open merely by the operation of the suction of the piston in the cylinder.

Another modification might be made by dispensing with the sleeve $a$ and the cams $c$ and $d$ thereon and simply so connecting the stems of the valves H and K as that when the valve K opens to admit the charge of combustible mixture the valve H will also open to admit gas. The manner already described, and illustrated in the drawings, of operating the valves by means of the cams is, however, preferable, to the end of effecting reliable results under all circumstances. In Fig. I a port $z$ is shown as extending through the wall of the cylinder, communicating through a passage V with the exhaust-pipe W. This port $z$ is so located as to be uncovered by the piston when the latter reaches the limit of its forward stroke. When this port is employed in the structure, the small cams $x$ and $y$ on the sleeve $s$ can be dispensed with and said sleeve be provided with only the cam $g$.

For governing the speed any construction of centrifugal governor might be employed, but one of the usual construction would not effect a good regulation with the mode of operation described above.

When an impulse is given, it acts on the piston during an entire outward stroke, and the speed of the engine increases during this entire stroke. Then the speed diminishes until the next impulse is given. In order to effect a perfect regulation of the speed, the governor should have withdrawn the cam $g$ at the end of the stroke during which the impulse was given (in consequence of this impulse) whenever the limit of speed is reached. It should, therefore, act without any delay. All centrifugal governors have a somewhat delayed action, and I consequently prefer to employ a form of governor such as shown in Fig. IV. It consists of a hub $h$, mounted on shaft S, and a sleeve $s$, adapted to slide along said shaft. $k\ k$ are flat springs secured at one end to the hub $h$, and at their opposite ends to the sleeve $s$, and weights $w\ w$ are centrally carried by these springs.

When the springs $w\ w$ are bent by the outward movement of the weights, the sleeve $s$ is drawn toward the hub $h$, and in the present case the cam $g$ is thereby withdrawn, so as not to engage with the roller R, by which the exhaust-valve is actuated.

In order to attain the desired sensitiveness and celerity of action, the springs $w\ w$ are so mounted that the angle $v$ at which the spring is set with respect to a plane S K″ M, Fig. V, passing through the center of the shaft and the center of gravity K″ of the weight which is carried by the spring is not equal to a right angle. When an impulse is given, the forces which act on the weights $w$ are, first, the centrifugal force represented by the line K″ M, whose component K″ P, normal to the spring, tends to bend the same; second, the tangential force of inertia represented by K″ N, whose component K F also tends to bend the spring out. This last force acts only as long as the speed is increasing during the impulse, but it may be made to act powerfully in the same direction as would an actual increase of speed, so as to withdraw the cam $g$, even before the ultimate speed is reached. If the angle $v$ of the spring is properly adjusted, the delay in the effect of centrifugal force upon the weights carried by and forming part of the governor may be wholly counteracted.

I have described an engine of horizontal construction provided with a side shaft. The mode of operation described in connection therewith and embodying my invention can, however, be applied to engines of very different construction, and the governor can be used also in somewhat modified form.

While I have illustrated and described a construction of governor specially adapted for use with the gas-engine described, I do not claim it in this application, as it forms the subject-matter of another application filed by me April 17, 1895, under Serial No. 546,027.

Having thus described my invention, what I claim as new, and desire to secure by Letters Patent, is—

1. In a gas or oil engine, the combination of a piston, a cylinder within which such piston is adapted to travel, inlet and exhaust ports communicating with the cylinder, valves for covering and uncovering said ports, a cam adapted to open the inlet-valve on the suction outstroke of the piston and to allow said valve to close on the instroke of the piston, and a governor provided with two cams, one of which operates to open the exhaust-valve on the exhaust instroke of the piston during its normal speed, the other cam being adapted to open the exhaust-valve only near the end of the exhaust instroke, and when the speed of the piston is above the normal rate, all substantially as set forth.

2. In a gas or oil engine, the combination of a piston, a cylinder within which such piston is adapted to travel, inlet and exhaust ports communicating with the cylinder, valves for covering and uncovering said ports, a cam adapted to open the inlet-valve on the suction outstroke of the piston and to allow said valve to close on the instroke of the piston, and a governor provided with three cams, one of which operates to open the exhaust-valve on the exhaust instroke of the piston during its normal speed, another cam which is adapted to open the exhaust-valve only near the end of the exhaust instroke, and when the speed of the piston is above the normal rate, and the third cam adapted to open the exhaust-valve at the end of the exhaust outstroke of the piston, when a partial vacuum has been formed behind it, all substantially as set forth.

3. In a gas or oil engine the combination of a piston and a piston-cylinder, inlet and exhaust ports communicating with the cylinder, valves for covering and uncovering said ports, the shaft $u$ provided with projecting arms bearing against and adapted to operate the stems of the inlet-valves, an arm projecting outward from the shaft $u$, a governor-shaft and a cam $c$ on the same for operating said arm, and another cam on the governor-shaft for pushing said outwardly-projecting arm out of the course of the cam $c$, all substantially as and for the purposes set forth.

4. In a gas or oil engine the combination of a piston and a piston-cylinder, inlet and exhaust ports communicating with the cylinder, valves for covering and uncovering said ports, a lever adapted to operate the exhaust-valve, and a governor having a sliding sleeve provided with the cam $x$ for operating said lever to open the exhaust-valve only near the end of the exhaust instroke of the piston and when the speed of the piston is above the normal rate of speed, all substantially as set forth.

5. In a gas or oil engine the combination of a piston and a piston-cylinder, inlet and exhaust ports communicating with the cylinder, valves for covering and uncovering said ports, a lever adapted to operate the exhaust-valve, and a governor having a sliding sleeve provided with the cam $y$ for operating said lever to open the exhaust-valve at the end of the exhaust outstroke of the piston when a partial vacuum has been formed behind it, all substantially as set forth.

In testimony whereof I have hereunto subscribed my name, before two subscribing witnesses, on this 21st day of June, A. D. 1893.

PAUL A. N. WINAND.

Witnesses:
GEO. W. REED,
CHAS. C. COLLIER.